United States Patent [19]

Tasaku et al.

[11] 4,099,208
[45] Jul. 4, 1978

[54] FACSIMILE SCANNING SYSTEM

[75] Inventors: Wada Tasaku, Tokyo; Sasamoto Noboru; Oshima Shintaro, both of Musashino; Nakao Kozo, Hoya; Hattori Naohiko, Tokyo; Azuma Nobuhiro, Tokorozawa, all of Japan

[73] Assignee: Kokusai Denshin Denwa Co., Ltd., Tokyo, Japan

[21] Appl. No.: 800,534

[22] Filed: May 25, 1977

[30] Foreign Application Priority Data

May 25, 1976 [JP] Japan .................................. 51-59579

[51] Int. Cl.² .......................... H04N 1/22; G02B 5/16
[52] U.S. Cl. .................................... 358/296; 250/227
[58] Field of Search ............. 358/296, 297, DIG. 901; 250/227

[56] References Cited

U.S. PATENT DOCUMENTS 3,588,514  6/1971  Simpkins .............................. 250/227
4,054,928  10/1977  Butler et al. .......................... 358/296

*Primary Examiner*—Daryl W. Cook
*Attorney, Agent, or Firm*—Armstrong, Nikaido, Marmelstein & Kubovcik

[57] ABSTRACT

A liner scanning device for a facsimile system comprises a carrier which carries a write head and a read head mounted on a belt which is moved linearly in both directions by a pulse motor. The read head is composed of the end of a flexible optical fiber assembly having an emission fiber for illuminating a spot on an original paper and a receiving fiber for detecting the reflected brightness of a cell in said illuminated spot. The write head is composed of the end of the other optical fiber one end of which is positioned at the output of a laser beam source, which heats a thermal printing paper selectively through the optical fiber. Thus the thermal printing paper is heated by a laser beam and the color of the paper is selectively changed according to the pattern to be printed.

3 Claims, 8 Drawing Figures

4,099,208

FACSIMILE SCANNING SYSTEM

BACKGROUND OF THE INVENTION

The present invention relates to a facsimile scanning system, in particular, relates to the structure of a head assembly having both a read head and a write head for use in said facsimile scanning system.

There have been known many recording or printing systems for facsimile systems. Some of which are electric discharge printing, electro-static printing, and thermal printing. Among them, thermal printing heads have many advantages for use in a facsimile system, since the price of a thermal paper is cheap, and also, no gas or odor appears during the printing operation in a thermal printing head. A thermal printing head operates on the principle that a thermal paper the color of which is changed by heating the same is heated by the thermal head selectively in a scanning operation.

However, a prior thermal head has the disadvantages that the resolving power of the prior thermal head is small, and the printing speed is slow.

SUMMARY OF THE INVENTION

It is an object, therefore, of the present invention to overcome the disantages and limitations of prior art by providing a new and improved head assembly in a facsimile system.

The above and other objects are attained by a head assembly comprising a flexible optical fiber assembly one end of which is supported at said carrier and the other end of which is pivotably fixed at a bearing, said flexible optical information on an original paper and a write head for printing a pattern on a thermal paper using the thermal printing principle, said read head having a plurality of thick emission fibers one end of which are positioned in front of a lamp and a thin receiving fiber one end of which is positioned in front of a photo-electric convertor, the other end of the receiving fiber receiving the reflected light beam from the original paper illuminated by the other end of said emission fiber, said write head having a long optical fiber one end of which is positioned at the output of a laser beam source generating a laser beam modulated by the pattern to be printed and the other end of which is positioned for scanning a thermal printing paper and for emitting said laser beam on that paper.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENT

Figure 1:
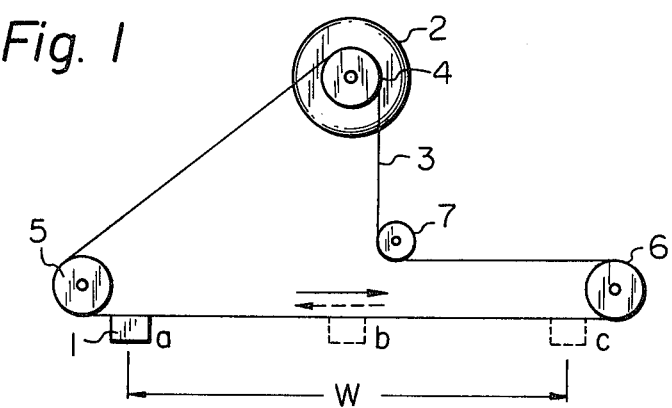
FIG. 1 is a schematic diagram of the main scanning operation of a preferred embodiment of the facsimile system according to the present invention.

FIG. 1 is a schematic diagram of the drive means of the main scanning section of a facsimile system according to the preferred embodiment of the present invention. A carrier 1, to which a read-head and a write-head are fixed, is mounted on a belt 3. The belt 3 is held tightly by pulleys 4, 5, 6 and 7, the pulley 4 is fixed to the axis of a pulse motor 2 for the main scanning operation which is achieved by the alternate foreward and backward movements of a carrier 1 from the position (a) through the position (b) to the position (c) and vice versa. The original paper or printing paper, whose width corresponds with the distance W between the position (a) and (c), is scanned by the readhead or writehead as either head makes a horizontal reciprocating movement.

Figure 2:
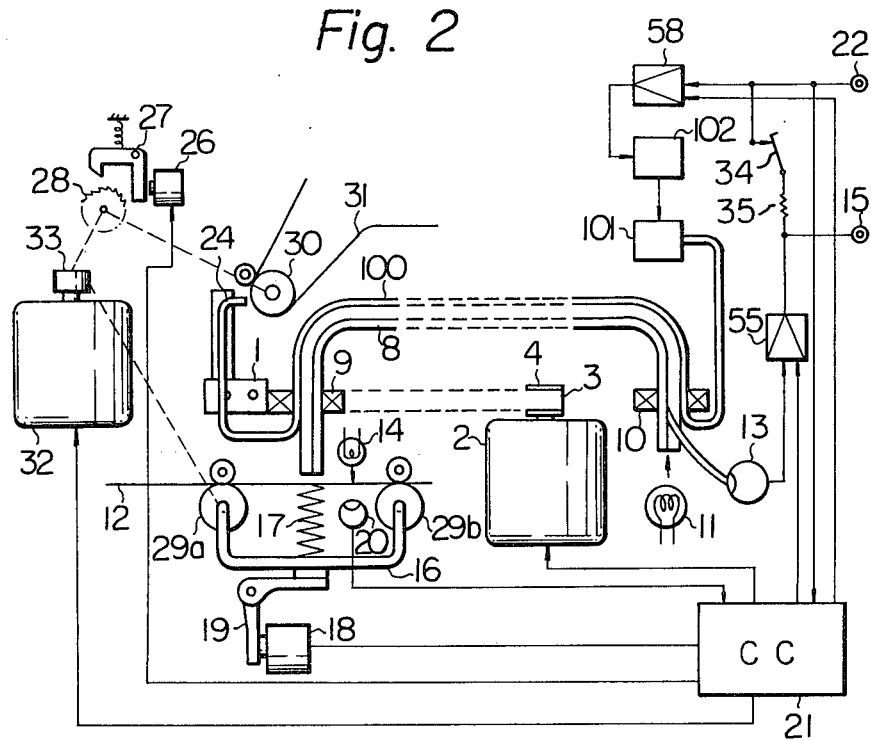
FIG. 2 is an illustrative diagram of the mechanical composition of the above embodiment.

FIG. 2 is a schematic diagram of the mechanical structure of the above embodiment according to the present invention. The end of an optical fiber, which is positioned at 24 (write-head) facing the thermal printing paper 31, is supported by the bearing 9 which is fixed to the carrier 1. The other end of the optical fiber 100, which is supported by the bearing 10, is positioned facing the output section of the laser beam source 101. The image information from an input terminal 22 is applied to the laser beam control circuit 102 through the amplifier 58. The image information to be printed is converted by the laser beam control circuit 102 and the laser beam source 101 from the electrical signal form to the optical laser signal form. The laser beam thus generated by the laser beam source 101 is applied to the thermal printing paper 31 through the optical fiber 100 and the write-head 24 composed at the extreme end of the optical fiber 100. When the thermal printing paper is illuminated by the laser beam, the paper is selectively heated and the color of the paper is selectively changed. Thus, a pattern corresponding to the image information applied to the terminal 22 is drawn on the thermal printing paper by the thermal printing principle.

With further reference to FIG. 2, the other portions of the above embodiment of the present invention will be described below.

The end of an optical fiber 8 for reading, supported with said optical fiber 100 by said bearing 9 which is fixed to the carrier 1, is disposed as a read-head facing the original paper 12. The other end of said optical fiber 8 which is supported with said optical fiber 100 by said bearing 10, is disposed in front of the light source 11 and the photoelectric converter element 13. A pulse motor 2, which is for the main scanning operation, drives the carrier 1 through the belt 3. A pulse motor 32 is for the auxiliary scanning operation (feeding the original paper and the printing paper), on which the pulley 33 is axially mounted. The pulley 33 is connected to a roller 29a for feeding the original paper, a ratchet gear 28 and a roller 30 for feeding the printing paper. It will be clear that, in this embodiment, main or scanning operation is accomplished with a single drive source in both the transmission and reception operations. An electro magnet 21 is provided for stopping the printing. Upon actuation of the electro magnet 29 the latch lever 27 is pulled to said magnet so as to lock the ratchet gear 28, thus cutting off the power from the pulse motor 32. Accordingly, the actuation of the electro magnet 26 prevents the feeding of the printing paper for the auxiliary scanning operation, when no reception is in progress, and for reception the electro magnet 26 is deactuated releasing the latch lever 27 from the ratchet gear 28. An electro magnet 18 is provided for transmission. Upon insertion of the original paper 12, the light beam from the light source 14 to the sener 20 is shut off by the original paper 12, which causes the control circuit 21 to actuate said electro magnet 18 pulling the lever 19, thus pressing up the original paper feeder section 16 against the compression spring 17. Consequently, when the original paper 12 is pinched by the rollers, 29a and 29b, (for feeding the original paper) and by the auxiliary rollers respectively positioned opposite thereto, the reading and feeding (auxiliary scanning) steps for the original paper are ready to start. Accordingly, for the transmission, said electro magnet 18 is actuated so as to perform the reading and feeding operation, and when a transmission is not in progress the electro magnet 18 does not function for the reading and feeding operation. It should be pointed out that the actuation of both electro magnets 26 and 18 is fully controlled by the control circuit 21. The switch 34 is furnished as a key for switching from the "communication mode" to the "local mode" (or test mode) and vice versa and the resistance 35 is a dummy resistor in the local mode.

Figure 3:
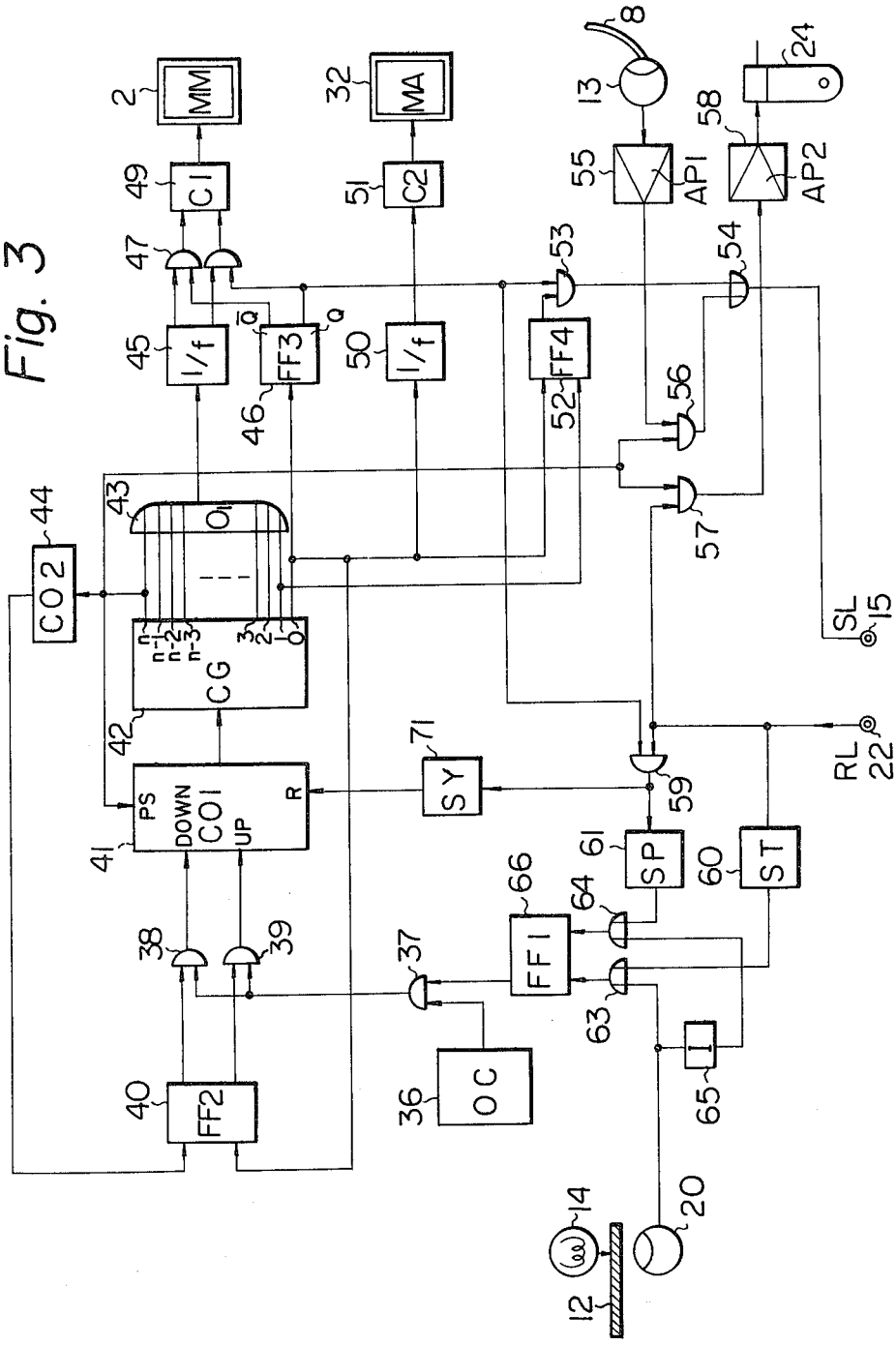
FIG. 3 is a block diagram of the control circuit of the embodiment.

FIG. 3 is the block-diagram of the main portion of the control circuit according to the present invention. The operation of the present facsimile system will be explained in accordance with FIG. 3 hereinafter.

(1) TRANSMISSION OPERATION

The present facsimile apparatus operates as a master station and sends a synchronization signal to the corresponding facsimile apparatus in a slave station. The transmission operation is initiated by the insertion of the original paper 12. The original paper 12 interrupts the light beam from the light 14 and thus the sensor 20 inverts the flip-flop 66, which opens and AND-circuit 37 through the OR-circuit 64, thus the output pulses from the oscillator 36 are applied to the AND-circuits 38 and 39. The output from the sensor 20 is applied to the magnet 18 through the invertor 65 and the amplifier 69, thus the original paper supply means operates. The output of the flip-flop 40 is, first, applied to the 'UP' terminal of the counter 41 through the AND-circuit 39, and then the counter 41 increases the content of the same. The counter 41 causes the clock pulse generator 42 to provide the output clock pulses (0), (1), (2), .... (n), which are applied to the main scanning pulse motor 2 through the OR-circuit 43, the divider 45, AND-circuit 48 and the drive circuit 49, thus the pulse motor 2 is accelerated and decelerated. When the pulse "n" is reached by the clock pulse generator 42, a present signal is applied to the counter 41, and the clock pulse generator 42 provides the pulse "n" continuously, and the pulse motor 2 rotates at a constant speed. At the same time, the second counter 44 starts operation and counts the number of the pulses "n". The counter 44 counts the number of pulses applied to the motor 2 during each scanning cycle. When the content of the counter 44 reaches a predetermined value, the counter 44 inverts the condition of the flip-flop 40, and then the output of the oscillator 36 is applied to the "DOWN" input of the counter 41 through the AND-circuit 38. Accordingly, the clock pulse generator 42 provides the clock pulses (n), (n−1), (n−2), (n−3), ... (2) and (1), which decelerates the pulse motor 2. When the clock generator 42 reaches the clock pulse (0), the flip-flop 40 is inverted and the AND-circuit 39 is opened, thus the content of the counter 41 is increased again. The flip-flop 46 is also inverted and the AND-circuit 48 is closed and the AND-circuit 47 is opened. Then the pulse motor 2 rotates in the reverse direction. The transmission operation finishes when the sensor 20 detects the end of the original paper and inverts the flip-flop 66.

The synchronization signal is sent out from the flip-flop 52 through the AND-circuit 53, OR-circuit 54, and the output terminal 15, when the clock pulse (0) from the clock pulse generator 42 changes to the clock pulse (1). It should be noted that said AND-circuit 53 is opened only when the output Q of the flip-flop 46 is ON (which indicates that the carrier 1 in FIG. 1 is at point (a) ), and the condition of the flip-flop 68 is ON, and the synchronization signal is sent out only at that time. That is to say, the synchronization signal is sent out for every trip of the carrier 1 beginning and ending at positioned in FIG. 1 by the control of the flip-flop 46. The flip-flop 68 controls the synchronization signal which is sent either in transmission operation, or in case the receiving operation starts during the transmission operation, and that said receiving operation continues after the end of that transmission operation. The synchronization signal is stopped when the duration between the clock pulse (0) and the clock pulse (1) in the clock pulse generator 42, that is to say, the duration that the carrier 1 stays at the position (a) in FIG. 1, is longer than a predetermined interval (for instance, 0.5 seconds). When that condition occurs, the delay circuit 63 provides an output signal to the flip-flop 68, which is then inverted, and the AND-circuit 53 prevents the transmission of the synchronization signal.

A picture signal or an information signal is transmitted when the clock pulse generator 42 provides the clock pulse (n) where the pulse motor 2 is rotating at a constant speed, and the AND-circuit 56 is opened. At that time, the picture signal generated at the read head is sent to the output terminal 15 through the optical fiber 8, the photo detector 13, the amplifier 55, the AND-circuit 56, and the OR-circuit 54. When the clock pulse from the clock pulse generator 42 is (0), that is to say, when the carrier 1 is at the extreme left or right end of it's travel the pulse motor 32 for the auxuliary scanning is driven through the divider 50 and the drive circuit 51, and the original paper 12 is fed. In the present transmission operation, the AND-circuit 67 is opened, so the magnets 25 and 26 are energized through the amplifier 70, thus the writing operation is prevented.

(2) RECEIVING OPERATION

In the receiving mode, the present facsimile apparatus operates as a slave station and receives the synchronization signal from a master station (transmission station). The present facsimile apparatus is initiated in the receiving mode when the power source is switched on. The synchronization signal received at the input terminal 22 is detected by the signal test means 60, which causes the flip-flop 62 to open the AND-circuit 37 through the OR-circuit 64. Thus, the pulse motors 2 and 32 are driven similarly to the operation in the transmission mode described before. When the synchronization signal through the input terminal 22 is not received for a predetermined length of time (for instance 0.5 second), the signal test means 60 and 61 and the synchronization signal detector 71 operate, thus the flip-flop 62 is inverted and the receiving operation is stopped.

The synchronization signal received at the beginning of every scan of the carrier 1 from position (a) in FIG.

1 clears the content of the counter 41 through the synchronization signal detector 71 and the AND-circuit 59, which is opened by the signal from the output terminal Q of the flip-flop 46. Accordingly, the operation of the receiving station is synchronized with that of the transmission station on a start-stop synchronization principle, for every return trip of the carrier 1. A picture signal following the synchronization signal received at the input terminal 22 is applied to the write head 24 through the amplifier 58 and the AND-circuit 57, which is opened when the clock pulse ($n$) is provided at the output of the clock pulse generator 42. The output of the amplifier 58 is applied to the laser beam control circuit 102, which drives the laser beam source 101. The laser beam source 101 generates the laser beam the strength of which relates to the intensity of the cell of the pattern to be printed. The laser beam thus generated is sent to the write head 24 through the optical fiber 100, and heats the thermal paper selectively. Thus, the thermal paper is printed.

When the synchronization signal is detected by the signal test means 61 and the flip-flop 62 is inverted, the output terminal $\bar{Q}$ of the flip-flop 62 becomes "0", thus the AND-circuit 67 is closed, and the magnets 25 and 26 are not energized. Accordingly, the writing operation is possible.

(3) THE RECEIVING OPERATION DURING THE TRANSMISSION OPERATION

In this case, the present facsimile apparatus operates as a master station, and sends the synchronization signal to a slave station until both the transmission from the present apparatus and the reception from the slave station finish. When the signal is received by the station in the transmission mode described in the paragraph (1), that signal inverts the flip-flop 62 through the signal test means 60. Accordingly, the output terminals Q and $\bar{Q}$ of the flip-flop 62 have the outputs "1" and "0", respectively thus the AND-circuit 67 is closed, and the magnet 26 is de-energized. So the printing paper 31 can be supplied and the write head 24 can write on the thermal printing paper 31 (see FIG. 2). Since the "1" signal from the Q output of the flip-flop 62 is applied to the AND-circuit 37 through the OR-circuit 64, said AND-circuit 37 opens and thus the receiving operation is accomplished. When only the transmission operation is finished in the above situation, the sensor 20 causes the magnet 18 to be de-energized, thus the original paper supply means 16 (FIG. 2) is put in the lower position by the spring 17 (FIG. 2). Further, the flip-flop 66 is inverted. However, the AND-circuit 37 continues the open condition since the flip-flop 62 applies the output signal from the terminal Q to said AND-circuit 37 through the OR-circuit 64. Thus, the main scanning and the auxiliary scanning continue. It should be noted that the synchronization signal is transmitted to the receiving station in a slave mode through the AND-circuit 53, the OR-circuit 54 and the output terminal 15, since the flip-flop 68 is not inverted. As explained above, the synchronization signal generated in the master station serves both the transmission operation and the receiving operation in the master station, since no synchronization signal is received when the receiving operation begins during the transmission operation.

(4) THE TRANSMISSION OPERATION DURING THE RECEIVING OPERATION

The present facsimile apparatus works as a slave station in this case and does not send the synchronization signal. When the original paper 12 is inserted during the receiving operation, the sensor 20 detects the presence of the original paper, and the original paper supply means 16 (FIG. 2) is energized through the inverter 65 and the amplifier 69, thus the transmission operation is performed. Although only the receiving operation finished in this case, the transmission operation continues by maintaining the main and the auxiliary scannings since the flip-flop 66 applys the signal to the AND-circuit 37. In this case, the output terminal $\bar{Q}$ of the flip-flop 62 is zero then the AND-circuit 67 is closed although the original paper is inserted. Accordingly, the output of the flip-flop 68 is zero, and the AND-circuit 53 is closed, thus the synchronization signal is not sent out.

(5) LOCAL OPERATION

In this mode, both the reading operation and the writing operation are accomplished within the present facsimile apparatus, thus the test of the apparatus can be performed, and the present facsimile apparatus can work as a copy machine. When the gang switch 34a and 34b is switched from the communication mode (CO) to the local mode (LO), the input terminal 22 is connected to the output terminal 15 through the artificial resistor 35, thus the transmitted signal is returned directly and is drawn on the printing paper. In this mode, the magnet 69 is energized and the magnet 26 is not energized, thus both the original paper and the printing paper are supplied.

Figure 4:
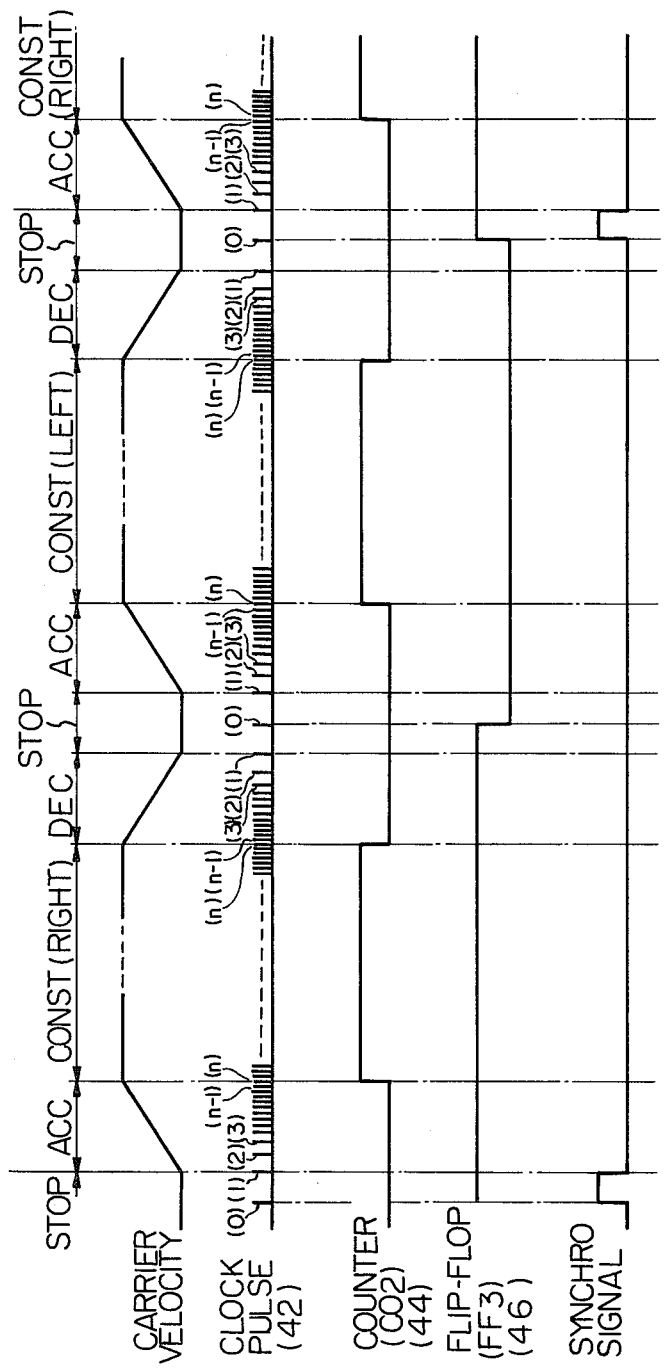
FIG. 4 is a chart illustrating the operation of the embodiment.

FIG. 4 shows the operational time chart of the present facsimile apparatus. The carrier 1 stationary at the left extreme and in the initial state, starts, is accelerated, runs at a constant speed, is decelerated and is stopped at the right extreme end. And the carrier 1 then returns to it's initial position through the acceleration, constant speed and the deceleration sequence. Each scanning cycle involves a pair of scannings from left to right and from right to left. The synchronization signal is sent out in every scanning cycle. The acceleration and the deceleration of the carrier 1 are controlled by the counter 41 and the clock pulse generator 42 in FIG. 3, and the duration that the pulse motor runs at a constant speed is defined by the number of pulses counted in the counter 44 (CO2). Said number of pulses during the constant speed depends upon the length that the carrier 1 moves by each pulse applied to the pulse motor. The transmission operation and the receiving operation are controlled by the clock pulses, and the difference in the period of the clock pulse in the transmission station and the period of the clock pulse in the receiving station is adjusted by the synchronization signal detector 71 which controls the counter 41.

Figure 5:
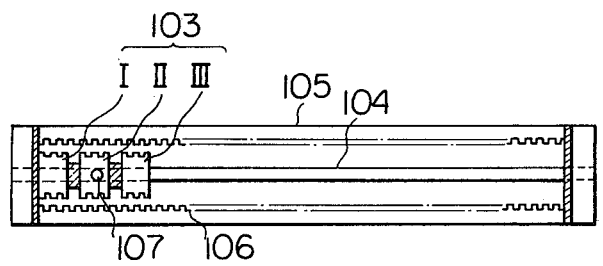
FIG. 5 is a plan view of another embodiment of the drive means for the main scanning operation according to the present invention.

In this embodiment of the present invention, the drive apparatus for the main scanning operation consists of the pulse motor, belt, and a carrier which is driven by the motor and the belt. However, it is to be understood that the present invention is not limited to such a type of drive apparatus, but is applicable to many other apparatuses, for example, to the other drive apparatus as illustrated in FIG. 5. FIG. 5 is a plan view of a step-type reciprocating movement apparatus. As shown in FIG. 5, there is provided a mover 103 for moving smoothly over the mover axis 104, having magnetic poles positioned on a side at a right angle to the direction of the movement of said mover 103, said magnetic poles are faced by a stator 105 and magnetic poles 106 provided to said stator 105. The mover 103 in the embodiment shown in FIG. 5 is composed of three carrier elements, I, II and III. The mover 103 is provided with a connection for fixing said carriers. There is at least one magnet pole for said mover 103 provided to each of the phases of exciting currents. The magnetic poles for said stator 105 are disposed corresponding those for the phases of said exciting currents in such a sequence that each of the stator poles may be faced with each of the poles for the exciting currents having a similar pitch. The magnetic poles for each phase on said mover 103 and those for each phase on said stator 105 are positioned in the pitch of $$\left( \frac{1}{\text{number of phases of exciting currents}} \right),$$

thus enabling the mover 103 or the carrier thereof to make a linear step-by-step movement when a voltage is applied step-by-step to a coil winding given to each of said phases. It will be clearly understood that this drive apparatus is based upon a drive means quite similar to the pulse motor 2 for the main scanning operation in the above embodiment of the present invention, having the capability of direct and linear travel. Accordingly, such a type of drive apparatus can provide a facsimile scanning system which is highly efficient and precise, and is low in manufacturing costs.

Figure 6A:
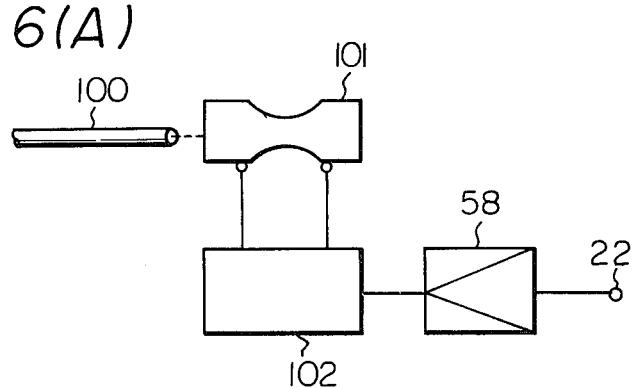
FIGS. 6(A), 6(B), and 6(C) are some embodiments of the laser beam source.

Now, the laser beam source in FIG. 2 will be explained in detail in accordance with FIGS. 6(A), 6(B), and 6(C). The carbondioxide gas laser which can generates the continuous infrared rays suitable to the printing, is the most desirable for the laser beam source 101. The strength modulation of the laser beam, that is to say, the laser beam is strengthened for the black cell of the image to be printed, and the laser beam is weakened for the white cell of the image to be printed, is accomplished either in FIG. 6(A), FIG. 6(B), or FIG. 6(C). In FIG. 6(A), the image signal applied to the terminal 22 provides the internal modulation of the laser beam. The signal for the black cell causes the large discharge current in the laser beam source 101 through the laser beam control circuit 102 and the amplifier 58, while the signal for the white cell controls the discharge current in the laser beam source 101 to zero or very small value.

Figure 6B:
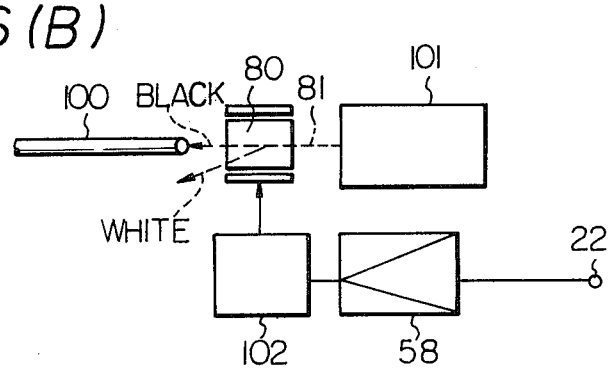

FIG. 6(B) shows another modulation system, in which the crystal body 80 like ADP crystal or KDP crystal having the opto-electric effect, deflects the laser beam. That is to say, the electric field relating to the signal applied to the terminal 22 is applied to the crystal 80, which deflects the laser beam 81, so that the laser beam relating to the black cell is received by the optical fiber 100 while the laser beam relating to the white cell goes out of the optical fiber 100.

Figure 6C:
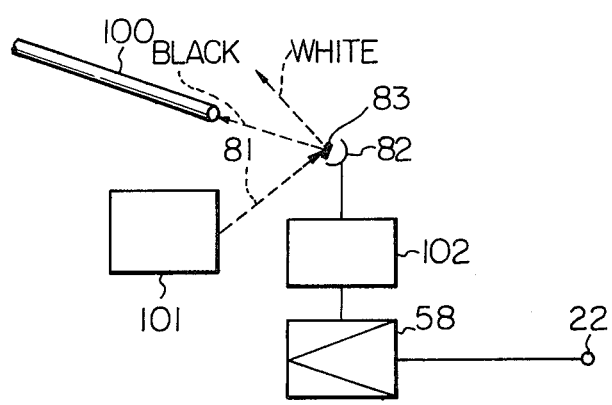

FIG. 6(C) shows the external modulation system, in which the mirror 83 of the vibrator 82 reflects the laser beam 81, so that the laser beam 81 from the laser beam source 101 relating to the black cell is received by the optical fiber 100, while the laser beam 81 relating to the white cell is not received by the optical fiber 100.

As is apparent from above explanation, the present facsimile scanning system has a simple head assembly structure, which prints on the thermal printing principle with a laser beam, thus high speed printing is accomplished with high resolving power, and the manufacturing costs of the present apparatus is low. So the present invention is very beneficial for a facsimile system.

What is claimed is;

1. A facsimile scanning system comprising a carrier movable linearly in both directions, a flexible optical fiber assembly one end of which is supported at said carrier and the other end of which is pivotably fixed at a bearing, said flexible optical fiber assembly composing a read head for reading optical information on an original paper and a write head for printing a pattern on a thermal paper by the thermal printing principle, said read head having a plurality of thick emission fibers one end of which are positioned in front of a lamp and a thin receiving fiber one end of which is positioned in front of a photoelectric convertor, the other end of the receiving fiber receiving the reflected light beam from the original paper illuminated by the other end of said emission fiber, said write head having a long optical fiber one end of which is positioned at the output of a laser beam source generating a laser beam modulated by the pattern to be printed and the other end of which is positioned for scanning thermal printing paper for emitting said laser beam on that paper.

2. The invention as claimed in claim 1, wherein said write head operates during the operation of said read head.

3. The invention as claimed in claim 1, wherein said carrier is supported on a belt engaged with a pulse motor.

* * * * *